Patented Dec. 16, 1930

1,785,181

UNITED STATES PATENT OFFICE

HARRY P. CORSON, OF LAKEWOOD, AND EARL S. RIDLER, OF SHAKER HEIGHTS, OHIO, ASSIGNORS TO THE GRASSELLI CHEMICAL COMPANY, OF CLEVELAND, OHIO, A CORPORATION OF DELAWARE

SOFT SOLDERING FLUX

No Drawing.    Application filed December 26, 1929.  Serial No. 416,755.

Zinc chloride alone or in solution together with various other compounds, such as hydrochloric acid, ammonium chloride, rosin, etc., is the commonest flux used in soft soldering operations.

We have found that the addition of aldehydes to zinc chloride base fluxes improves their properties of dissolving the oxide film on the metal pieces to be united and allows of a better spread, or flow of the solder, the flux itself covering a greater area of the metal.

Zinc chloride fluxes containing small amounts of aldehydes have furthermore the property of wetting oily or greasy metal where the film of oil or grease prevents the flux from penetrating to the metal itself. Whereas it is necessary with straight zinc chloride fluxes to thoroughly clean the metals before soldering, excellent soldering can be obtained using our compounded fluxes directly upon oily or greasy metal surfaces.

The amount of aldehyde required to improve the properties of a zinc chloride base flux is relatively small and of the order of a few per cent figured on the weight of the flux. Some aldehydes, such as formaldehyde and acetaldehyde are easily soluble in aqueous zinc chloride solutions. Though volatile, they act very well in such solutions. The less volatile, higher aldehydes are less soluble in zinc chloride solution, but they can be easily mixed therewith and when such mixtures are applied as fluxes they will produce a better spread of the flux and of the solder. The solubility of the aldehydes can be improved by using dilute alcohol as the solvent for zinc chloride.

Formaldehyde and acetaldehyde solutions, propionaldehyde, butyraldehyde, furfural, alpha-ethyl-beta-propyl-acrolein, aldol, benzaldehyde, etc., have been added by us in amounts ranging from 0.25 to about 5% of the weight of the flux, to a zinc chloride base flux of the composition:

75 parts zinc chloride 50% solution.
25 parts denatured alcohol.

These compounded fluxes gave in each case a better spread of the flux over the metal. In the case of butyraldehyde for instance, the area covered by a given amount of the flux containing 3% butyraldehyde was practically three times that covered by the same amount of aldehyde free flux. This improvement is particularly noticeable on oily, or greasy metal articles which are only difficultly wetted by ordinary zinc chloride fluxes, whereas our improved aldehyde containing fluxes readily cut through the film of oil or grease.

Addition of aldehydes to zinc chloride base fluxes of other composition produces compounded fluxes which similarly have a better spread and improved wetting power over aldehyde free compositions.

The action of the aldehydes seems to be independent of the basic composition of the zinc chloride fluxes; this gives a great latitude for the application of our invention and aldehyde zinc chloride base fluxes can be prepared to suit any particular soldering job.

The aldehydes can be added to the zinc chloride flux immediately before use or can be prepared beforehand, care being taken to well mix or shake the composition so that any undissolved aldehyde is well distributed throughout the flux.

The application of our improved aldehyde-zinc chloride fluxes is entirely similar to that of ordinary fluxes.

We claim:

1. In a process of soft soldering metals the step of applying a flux comprising zinc chloride and an aldehyde.

2. As a new composition of matter a soldering flux comprising a solution of zinc chloride and an aldehyde.

3. As a new composition of matter a soldering flux comprising zinc chloride in an aqueous-alcoholic solution and an aldehyde.

4. In a process of soft soldering metals the step of applying a zinc chloride flux in the presence of an aldehyde.

In testimony whereof, we affix our signatures.

HARRY P. CORSON.
EARL S. RIDLER.